(12) United States Patent
Wong et al.

(10) Patent No.: US 9,137,585 B2
(45) Date of Patent: Sep. 15, 2015

(54) METHOD AND APPARATUS FOR INSERTING ADVERTISEMENTS IN CONTENT (75) Inventors: Marshall Wong, New York, NY (US); Hsisheng Mark Sun, San Ramon, CA (US); Yun Huang, San Jose, CA (US)

(73) Assignee: BlackArrow, INC, San Jose, CA (US)

( * ) Notice: Subject to any disclaimer, the term of this patent is extended or adjusted under 35 U.S.C. 154(b) by 32 days.

(21) Appl. No.: 13/006,069

(22) Filed: Jan. 13, 2011

(65) Prior Publication Data
US 2012/0185895 A1 Jul. 19, 2012

(51) Int. Cl.
| H04N 7/173 | (2011.01) |
| H04N 7/10 | (2006.01) |
| H04N 21/81 | (2011.01) |
| H04N 21/262 | (2011.01) |
| H04N 21/472 | (2011.01) |
| H04N 21/482 | (2011.01) |

(52) U.S. Cl.
CPC ....... *H04N 21/812* (2013.01); *H04N 21/26258* (2013.01); *H04N 21/47202* (2013.01); *H04N 21/4825* (2013.01)

(58) Field of Classification Search
CPC ............ H04N 21/812; H04N 21/4532; H04N 21/47202
USPC ................ 725/32, 34–35, 46, 87–88, 93, 115
See application file for complete search history.

(56) References Cited

U.S. PATENT DOCUMENTS

| 2002/0178443 | A1* | 11/2002 | Ishii ................................ 725/22 |
| 2002/0191950 | A1* | 12/2002 | Wang ............................... 386/46 |
| 2003/0028893 | A1* | 2/2003 | Addington .................... 725/115 |
| 2003/0149975 | A1* | 8/2003 | Eldering et al. ................ 725/34 |
| 2005/0010953 | A1* | 1/2005 | Carney et al. ................... 725/61 |

* cited by examiner

*Primary Examiner* — Nathan Flynn
*Assistant Examiner* — Sumaiya A Chowdhury
(74) *Attorney, Agent, or Firm* — FSP LLC (57) ABSTRACT

A video on demand server includes a video pump an ad management system interface to disable fast forwarding during commercials and allow fast forwarding during play of content. A playlist generator configures the disabling and allowing of fast forwarding and compiles the playlist from (a) separately provided breakpoints for the commercials during presentation of the content, and (b) an ad map including trick mode instructions that define commands for enabling and disabling trickmode during presentation of the commercials.

12 Claims, 6 Drawing Sheets

| BP NAME | PROGRAM POSITION | BP SEQUENCE | ACTION | TRICK MODE | DURATION |
|---|---|---|---|---|---|
| LEAD BLACK | PRE-ROLL | 1 | FIXED | FF, RW, P | :07 |
| PRE-ROLL | PRE-ROLL | 1 | FILL | FF | :30 |
| MID-ROLL 1 | MID-ROLL | 1 | REPLACE | FF | :30 |
| MID-ROLL 2 | MID-ROLL | 1 | REPLACE | FF | :15 |
| MID-ROLL 2 | MID-ROLL | 2 | REPLACE | FF | :30 |

FIG. 3

PLAYLIST OUTPUT:
PROGRAM CONTENT (LB): 00:00.000 TO 00:07.000 (FF, RW, P)
PRE-ROLL 1-1 (:30)(FF)
PROGRAM CONTENT: 00:07 TO 07:59
MID-ROLL 1-1 (:30)(FF)
PROGRAM CONTENT: 10:00 TO 19:59
MID-ROLL 2-1 (:15)(FF)
MID-ROLL 2-2 (:30)(FF)
PROGRAM CONTENT: 22:00 TO 28:05.000

METHOD AND APPARATUS FOR INSERTING ADVERTISEMENTS IN CONTENT

BACKGROUND

This relates generally to the dynamic insertion of advertisements into entertainment content.

An asset is video, rich media, audio, or graphic information that can be an advertisement or entertainment content. Content refers to any entertainment asset created by a content provider. Content is not used to refer to advertising assets. Content generally refers to an episode or a program, such as a group of episodes. A content provider is an organization responsible for the creation of content.

In connection with professionally produced content, such as content produced for television, content providers cannot reach audiences without distributors. Distributors are organizations responsible for distributing content to a viewing audience. A distributor is also known as an operator. A distributor includes a cable television supplier, a satellite distribution supplier, a web portal, a local affiliate broadcaster, double communication systems, fixed and mobile WiMAX systems, telephone systems, Internet service providers, wireless carriers, and a provider of video information, such as a video on demand supplier, to mention a few examples. Content providers reach audiences through distribution platforms. Distribution platforms include cable television, cable video on demand, cable digital video recorders, cable network video recorders, broadband video sites (e.g., mtv.com), broadband video portals (e.g., Hulu.com), local affiliate broadcasters, double communication systems, fixed and mobile WiMAX systems, and telephone systems, to mention a few examples.

In some instances, a content provider owns and operates their own distribution platform (e.g., ABC.com). However in other instances, the distribution platform is owned and operated by a separate company or organization (e.g., Comcast Cable).

Generally, as used herein, the pre-roll is that time period before the content starts, the mid-roll is that time period during content presentation, and the post-roll follows the end of the program content. As used herein, video on demand or VOD is one continuous stream of content.

In dynamic advertising insertion, ads are played for a given ad opportunity or ad avail based on a client context. For example, any time certain user operations occur, an advertisement may be inserted. Examples of this include when the user begins to play a content, the user hits a pause icon, or when a period of time has passed, an advertisement may be inserted. Thus, the frequency of ad insertion, the number of ads that may be inserted, and the time when the ad is inserted may not always be known in advance. In other words, the timing and number of advertising opportunities may not be known in advance with dynamic advertising insertion.

DETAILED DESCRIPTION

Figure 1:
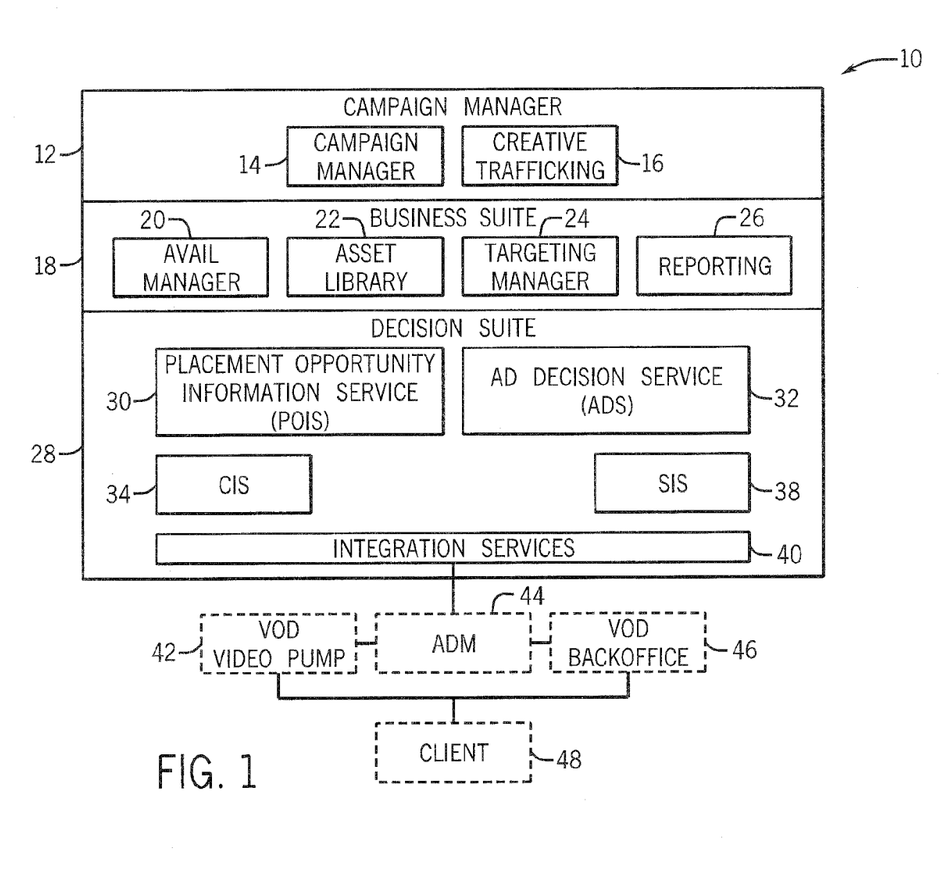
FIG. 1 is a system depiction for one embodiment of the present invention.

Referring to FIG. 1, the advertising distribution system 10 may be implemented in hardware, software, or firmware. The system 10, shown in FIG. 1, is simply one example and a variety of other architectures may be used to implement many of the embodiments of the present invention. However, for purposes of illustration, the system 10 may include a campaign manager 12, including a campaign manager module 14 and a creative trafficking module 16. Each of the modules in the system 10 may be implemented in software, hardware, or firmware.

The campaign manager module 14 may create and manage advertising campaigns. It may also assign pacing, priority, and execution rules for advertising insertion. In addition, the campaign manager may create advertising products and rate cards.

The creative trafficking module 16 may traffic creative assets to campaigns and apply creative rotations.

The campaign manager 12 may communicate with a business suite 18. The business suite 18 may include an avail manager 20 that creates and defines advertising formats and advertising loads. These advertising formats and advertising loads are referred to herein as advertising maps. The avail manager also manages affiliate rights and ad splits. Ad splits are the split of revenues, from playing ads, for example, between operators and various content providers whose content was interrupted for the display of advertisements that created the revenue.

The asset library 22 manages program and creative asset metadata and provides visibility into asset availability. The targeting manager 24 manages and customizes targeting used by the sales organization, including dayparts, programs, geo, and the like. The reporting module 26 may report on campaign performance, provide billing and invoicing functions, provide inventory supply and analysis, and generate business reports.

The decision suite 28, which may communicate with the business suite 18 and the campaign manager 14, may include a placement opportunity information service or POIS 30. The POIS 30 determines which advertising map to assign for a given video on demand (VOD) session. (While the present application refers to video on demand or VOD, the present invention is also applicable to many other content distribution modalities, including, for example, the use of network digital video recorders, set top box digital video recorders, traditional linear cable, broadband and/or smart televisions or connected televisions, and advanced set top box applications, as additional examples). The POIS may also determine inventory advertising rights, based on what has been defined in the avail manager. The advertising decision service 32 determines which ad to deliver based on content attributes, subscriber attributes, and active advertising campaigns.

The content information service or CIS 34 stores content metadata for video on demand program assets, including genre, rating, title, and the like. The content metadata may be evaluated by the ad decision service 32 when the ad decision service is determining which ad to display for a given opportunity.

The subscriber information service or SIS 38 stores subscriber demographic attributes, such as geographic location and income. The subscriber information is also evaluated by the ad decision service 32 when the ad decision service is determining which ad to display for a given opportunity.

Integration services (IS) 40 then combines the information from the CIS, including break points, the POIS, namely, the advertising map, and the ad decision service, which includes the actual ads, and forms a final playlist, that specifies how to play the asset, with frame accuracy and trick mode controls for each of the avails. The break points are time indications for when to break into the ongoing entertainment asset display for insertion of advertisements.

While the specification of the break points may originate in various places, in some embodiments, it is provided by the content provider, the operator, or distributor, together with the entertainment content. Break points can also be provided separately from the rest of the program metadata. The break points may be metadata in one embodiment.

The ad management service, or ADM 44, coordinates interface responses between the video on demand video pump 42, the client 48, and the IS 40. See American National Standard, ANSI/SCTE 130-3 2009, available from the Society of Cable Telecommunications Engineers, Exton, Pa. 19341. The video pump 42 is responsible for executing the playlist. The video pump receives the playlist from the ADM and then the video pump streams the video that is sent down to the client 48. The client in a video on demand or network digital video recorder (nDVR) may be a set top box in the viewer's home, as one example. The VOD back office 46 supports VOD session management, targeted advertising, content pre-selection, push VOD and transactional VOD in some embodiments.

In accordance with some embodiments of the present invention, break point information may be stored with each entertainment asset and delivered through the content information service (CIS) 34. The content information service may first get the break point information alone or with other content metadata and then pass that break point information to the program opportunity information service (POIS) 30 to get the dynamically assigned advertising map with the advertising payload and trick mode controls and then pass them to an ad decision service (ADS) to get dynamically inserted commercials. The integration services 40 may then combine the information from the content information service, such as break points, the information from the POIS, such as the advertising map, and the ads themselves and form a final playlist with frame accuracy and trick mode controls for each of the avails.

In some embodiments, different advertising maps may be assigned dynamically by a avail manager 20 and executed on a POIS 30. In still other embodiments, trick modes may be selectively disabled so that certain features are disabled during commercials that are available during content. For example, rewind or fast forward may be disabled during the commercial to prevent the user from skipping the commercial which may be responsible for the user's ability to get the free content, in some embodiments.

Figures 2, 3:
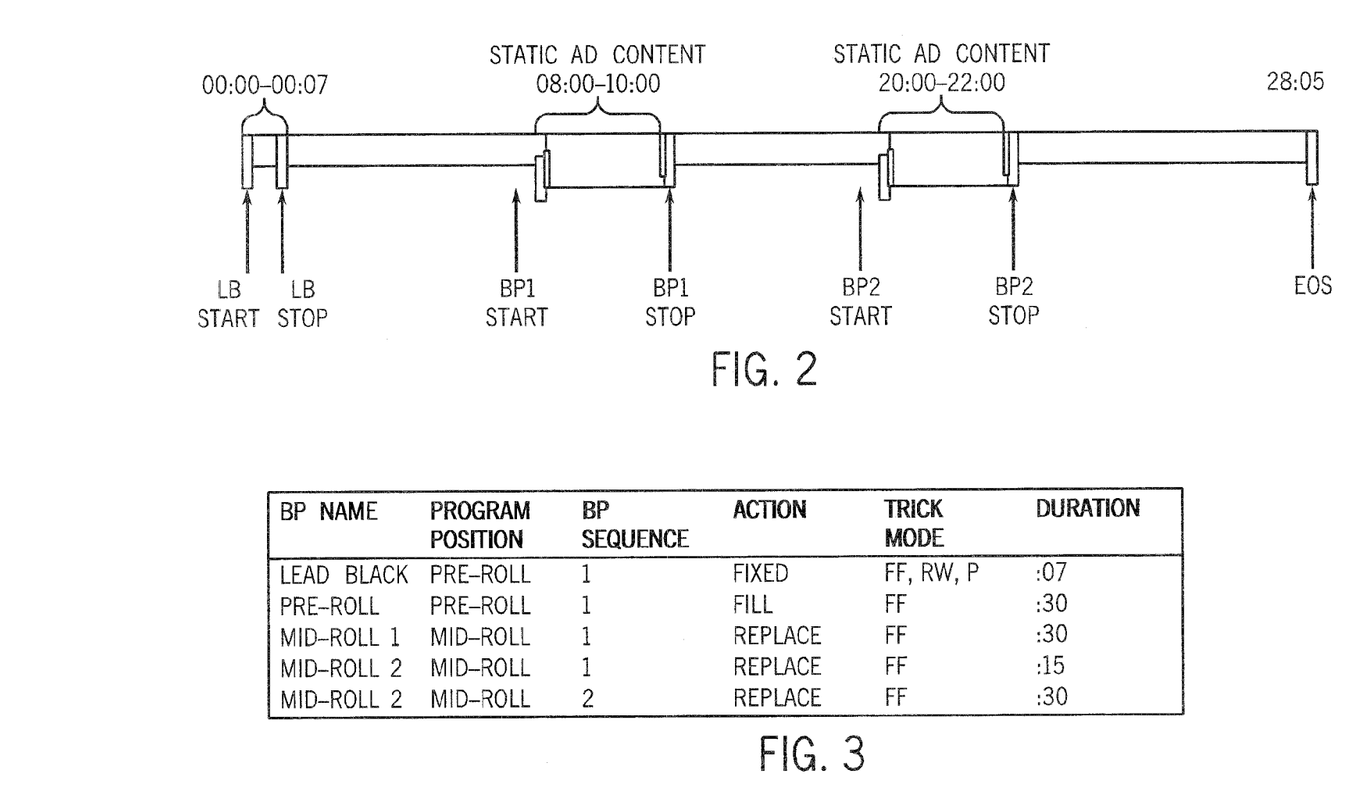
FIG. 2 is a time line for a content showing break point data for a program asset in accordance with one embodiment.
FIG. 3 is a depiction of an advertising map in accordance with one embodiment.

Now, referring to FIG. 2, an example of a time line for an asset is depicted. The time line indicates playing content at times 00:07 to 08:00, 10:00-20:00 and 22:00-28:05 for example. Each pair of adjacent arrows below the time line and each overlying bracket above the time line indicate one break point. The break point may be specified by indicating a time within the entertainment asset for advertising insertion.

One advantage of using predefined break points is that a permanent location may be known within the content for future interruption that will not unduly affect the play of the entertainment asset. Thus, the break point may be located at a natural pause in the action in the content and at least defines the location where a cut may be made without unnecessarily breaking continuity, speech, or other audio.

Thus, a series of break points may be specified within the entertainment asset, for example, by identifying their times and, in some cases, their duration as well. However, the break point is not necessarily limited to any pre-assigned duration and the inserted advertisements may ultimately be any desired time duration. However, the break point provides a fixed, predetermined "place" where advertisements of any duration may be inserted.

Turning next to FIG. 3, an advertising map may provide an identification of break point (BP) names or identifiers, a program position, a break point sequence, the action to be done, any disabling of trick mode controls, and a duration indication. This is simply an example of one format for an advertising map that may be provided for users to specify their ad insertion preferences. It enables users to insert information about what they want to have done during each and every break point within a particular entertainment asset. In some embodiments, the advertising map may be in the form of a graphical user interface that enables advertisers to specify advertising placement in content.

In one embodiment, the break points may be named, based on where they are in the content, either in the lead black or LB, during the pre-roll (i.e. before the program starts), during the mid-roll (i.e. during the program), etc. The program position corresponds to the "name" in this illustrated embodiment. The break point sequence number specifies the order of the avail within a given break point, i.e. break point 1 could have three avails in it, with the first avail having a sequence number of 1, the second a sequence of 2, and so on.

The action column allows entry of a plurality of different activities during the break point. For example, "fixed" indicates that the existing advertising asset, called static advertisements, is maintained during the break point and no substitution or replacement of that asset is desired for this particular break point. "Fill" simply means to place static advertisements and add more advertisements, either before or after, the preexisting static or fixed content. Generally, the additional or added advertisements may be added before the static or preexisting advertisements. "Replace" means to replace the static advertising previously played during the break point with new and different advertising.

The trick mode column indicates what trick modes are to be disabled during the break point. Generally, content providers and advertisers prefer that viewers not fast forward through advertisements. Thus, fast forward (FF), rewind (RW), and pause (P) trick modes may be enabled or disenabled selectively for each break point. However, each of these trick modes may be fully enabled outside the break points in all cases, in some embodiments. Thus, in addition to specifying a useful place to insert advertisements, the break points also provide useful boundaries for trick mode limitations.

The trick mode disabling may be implemented by the video on demand server, in one embodiment. When the user elects fast forward, for example, and fast forward is defined within the playlist as being disabled, the user, in one embodiment, may simply be starved of the video so that the user is unable to fast forward. However, outside the break point time period, the trick mode features may all be enabled.

In FIG. 3, the duration identifies the duration of each avail that assigned by the advertising map. A break point can have none to many numbers of each avails assigned to a specific break point. Mid-Roll 2 for example is saying put a :15 second avail in sequence 1 and a :30 second avail in sequence 2. Flexible availsmay also be defined in some embodiments, i.e.

put an avail between :15 to :30 seconds in mid-roll 2 sequence 1 but only a :30 second avail in mid-roll 2 sequence 2.

One advantage of the use of pre-assigned or predetermined break points, together with the advertising map, is that content providers can create a reusable ad model template. For example, they may specify that one 30 second advertisement may be inserted in the pre-roll, two 30 second advertisements may be presented in the mid-roll, and one 30 second advertisement may be presented in post-roll, without ever even knowing exactly what the asset is. Since the advertising map defines how many ads to slot in the pre-roll, mid-roll, and post-roll, the system 10 can simply use the break point specification to insert the advertisements at the requested places in the content of any number of entertainment assets. Thus, the advertising map provides a convenient tool to populate advertisements within an entertainment asset based on predefined guidelines provided by content providers, for example. This may result in a far more desirable user experience where commercials are not being inserted in the middle of important dialog or action scenes. Moreover, content providers and/or cable operators may have reusable ad templates which are easily matched up with specific ad insertion times.

Figure 4:
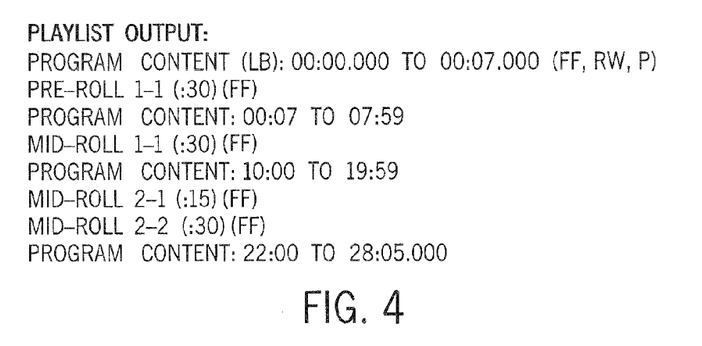
FIG. 4 is a depiction of a playlist output in accordance with one embodiment.

The advertising map, shown in FIG. 3, may then be compiled into a playlist output, shown in FIG. 4. The playlist indicates exactly what is to be done, at what times during asset play. Thus, for example, the program content may be provided from time 00:00 to time 00:07, which corresponds to the lead black time. The specification of FF, RW, and P trick modes, in one embodiment, indicates that each of these trick modes is disabled in this example. The pre-roll, which may include the first break point, is indicated to be 30 seconds long and may not be altered, in one embodiment. The program content from 00:07 to 07:59 may be interrupted by a 30 minute mid-roll of advertising.

In some embodiments, different advertising maps may implement different advertising assignment rules. For example, different advertisements may be shown in the time period within 72 hours of an original broadcast time versus thereafter. By specifying this time information, the advertising map may permit different advertisements to be inserted based on current time and the time since original broadcast. For example, for the first 72 hours, an advertising map may specify that action may be "fixed" and, thereafter, using a different advertising map, the action may be "replace." This feature may be used to take advantage of C3 Nielsen ratings, for example.

In general, the advertising map rule sets may allow for programmatic replacement of advertising packages based on a variety of characteristics, including audience demographics, time of day, time of year, time since original broadcast, and the like.

In accordance with some embodiments of the present invention, the video on demand content is provided with metadata that indicates the location of break points that have been predetermined to be effective places to insert advertisements of any desired duration.

The system 10 may provide a user interface for users to add/edit/delete break points. In some embodiments, the system 10 provides a user interface, in the form of an advertising map template, to enable users to select advertising avails (i.e. advertising placement opportunities) and to control the way that advertisements are asserted under various conditions. In some embodiments, the break points may be transmitted with the content and, in other embodiments, they may be provided out of band.

Figure 5:
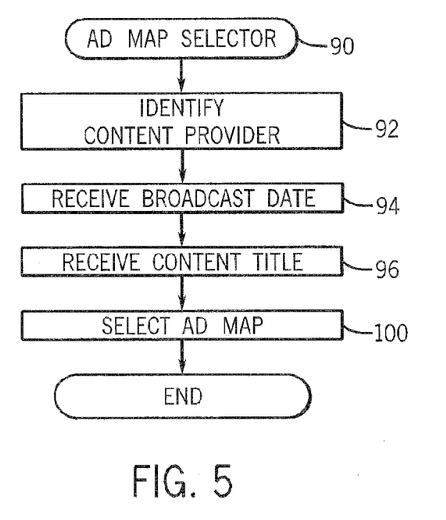
FIG. 5 is a flow chart for one embodiment of the present invention.

Referring now to FIG. 5, a sequence 90 for implementing the development of an advertising map may be used, for example, in connection with a graphical user interface for application of user data based on specific guided parameters or based on receipt of a template, which is generic to a variety of entertainment assets. The advertising map sequence may be implemented in software, hardware, or firmware. Again, in software related embodiments, computer executable instructions may be stored on a non-transitory computer readable medium. The sequence 90 may be implemented by the POIS 30, in one embodiment.

In one embodiment, the sequence shown in FIG. 5 implements the selection of the correct advertising map from among a plurality of advertising maps adapted to specific circumstances. In some embodiments, the same content may use different advertising maps based on whether the criteria such as when the user has viewed the asset relative to the broadcast date, time of day when the user is viewing the content, or other criteria. For example, in a Nielsen C3 application, within 72 hours of that broadcast date, an advertising map with an action of fixed would be utilized and, after 72 hours, an advertising map with an action of replace would be utilized. Many other examples exist with respect to various advertising maps that are used for different content providers, content duration, content type, and content provider.

In one embodiment, a content provider or other entity which would like to select and specify to some degree how advertisements are inserted into content may access a remote server which provides a graphical user interface to facilitate the transfer of information from that content provider to the modules that actually implement the insertion of the advertisements. To this end, the graphical user interface would provide a series of questions, selectable options or other data entry templates that would require that the user identify the content provider, as indicated in block 92 in FIG. 5, provide the broadcast date, as indicated in block 94, and indicate the content title, as indicated in block 96. Then the user may complete the information shown in FIG. 3. Initially, that user may have a graphical user interface that looks like FIG. 3, but with some or all of the information contained therein missing. Some of the information may already be completed because it is known, based on the type of advertising map that was selected by the system, which information to pre-specify and which information to leave for content provider ultimate specification.

Then, in block 100, the information from the graphical user interface of the type shown in FIG. 3, together with the information received in blocks 92, 94, and 96, is combined in order to select the correct advertising map for a particular situation. The selected advertising map then shows a case takes an active the ad opportunities there are, what their duration will be, and what trick mode control limitations will apply.

Figure 6:
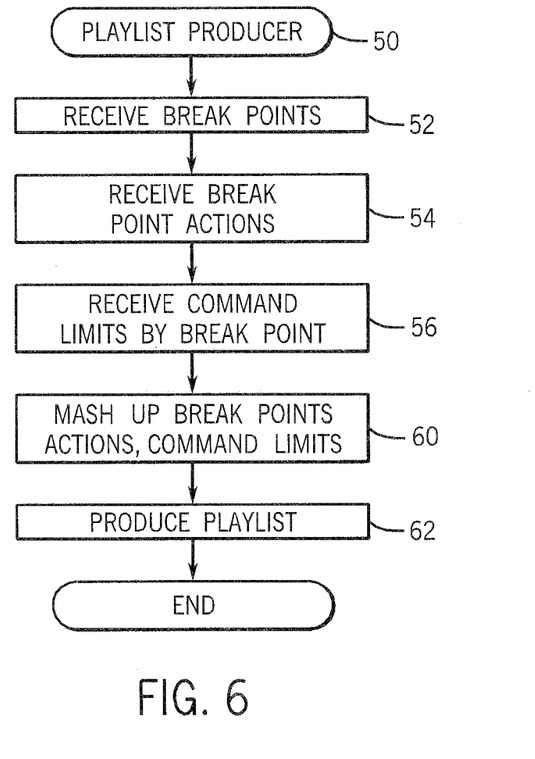
FIG. 6 is a flow chart for another embodiment of the present invention.

Referring to FIG. 6, a sequence 50 may be used by the POTS 30 for producing the playlist in one embodiment. The sequence 50 may be implemented in software, hardware, or firmware. In the software based embodiment, the sequence may be implemented by computer executable instructions stored in a non-transitory computer readable medium, such as a semiconductor memory, an optical memory, or a magnetic memory.

Initially, at block 52, the break points are received from an appropriate provider. The break points basically specify the times when it is possible to cut into the entertainment asset and insert advertisements. The break points may be received by the CIS 34 in one embodiment. In addition, the advertising map is consulted to determine the break point actions, as indicated in block 54. Next, the command limits for enabling or disabling the trick modes are received, as indicated in block 56. Thereafter, the break points, actions, and command limits (e.g. a trick mode command limitation), are put together to develop the playlist, as indicated in block 60. The playlist is produced, as indicated in block 62.

Figure 7:
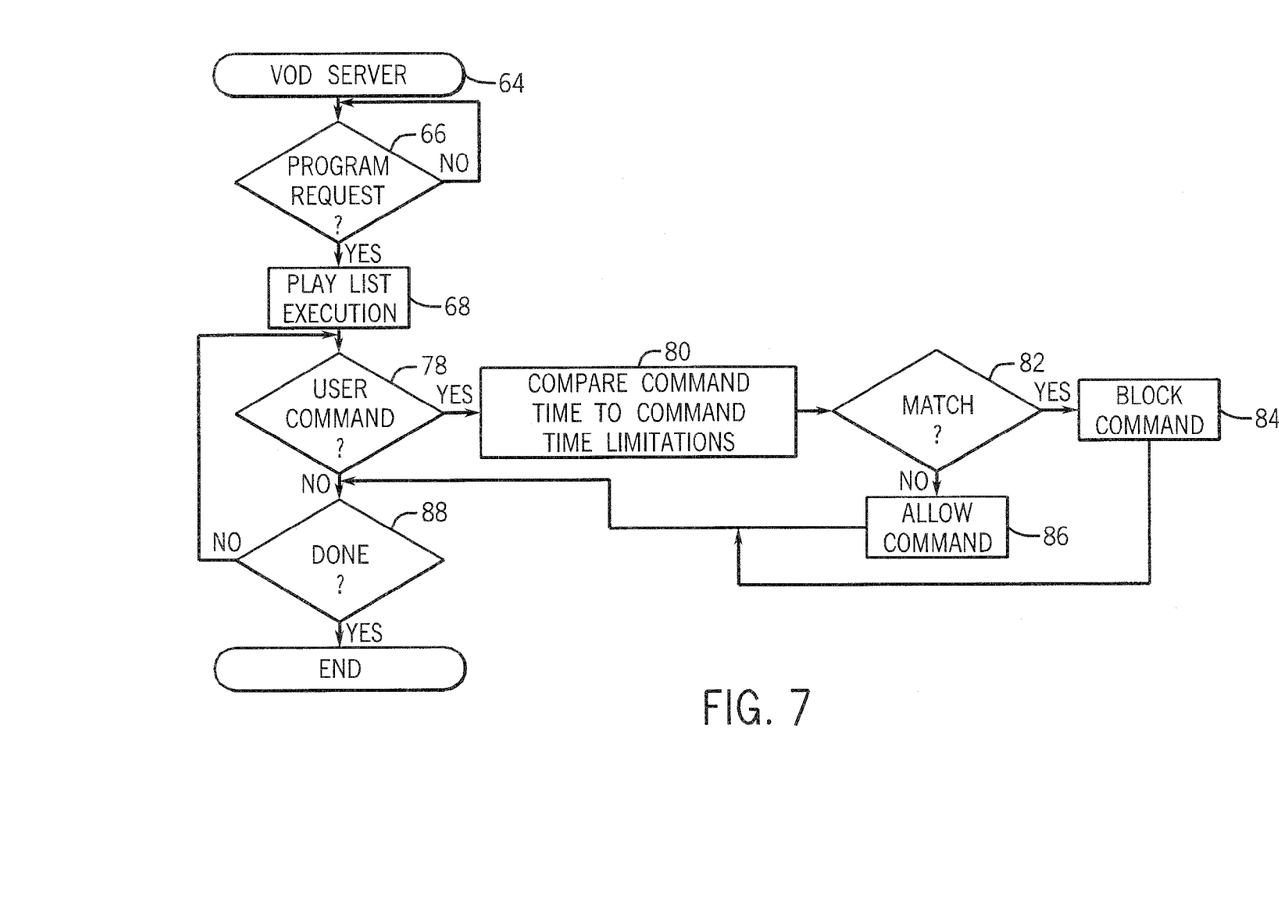
FIG. 7 is a flow chart for yet another embodiment of the present invention.

Referring next to FIG. 7, a sequence 64 for providing a VOD server functionality may be implemented as software, firmware, or hardware. Again, in the software embodiment, it may be implemented by computer executable instructions stored in a non-transitory computer readable medium.

A check at diamond 66 determines whether there is a request by a viewer to view a program. If so, the VOD server begins the execution of the playlist, as indicated in block 68.

Next, a check at diamond 78 determines whether there has been a user command. If so, the command time is compared to trick mode command time limitations to determine whether the command comes during a break point or during the play of normal entertainment assets and whether the commands were received at a time when there were trick mode command time limitations in effect, as indicated in block 80. Again, if there is a match, as detected at diamond 82, the command may be blocked, as indicated in block 84. Otherwise, if there is no match, the command is allowed, as indicated in block 86. A check at 88 determines whether the playlist has been completed. If not, the flow iterates back to block 68.

Of course, the provision of conditions, such as the Nielsen C3 time conditions have already been implemented through the selection of the correct advertising map based on the condition (FIG. 5). Thus, selection is further implemented based on the resulting playlist (FIG. 6).

While an example is given in which different advertising maps are dynamically assigned based on conditions or criteria related to time, other criteria may also be utilized, including, but not limited to, windowing, content duration, subscriber attributes, and content attributes, to give a few examples.

Figure 8:
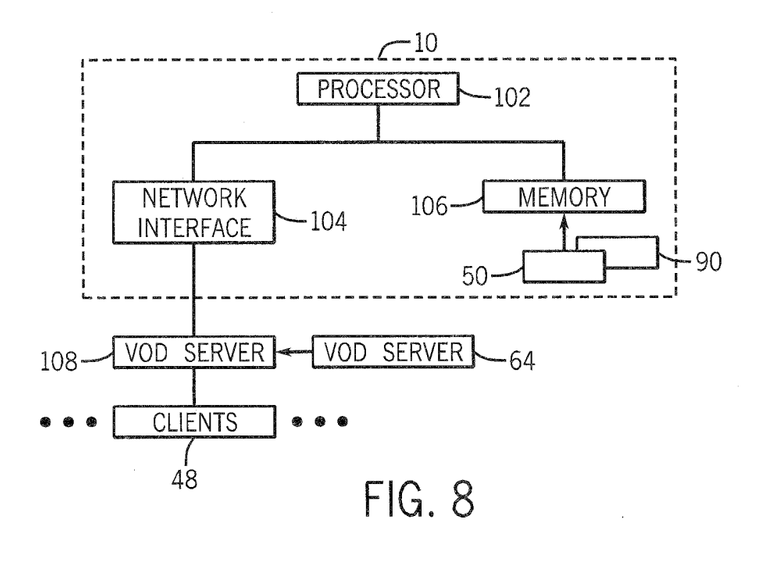
FIG. 8 is an architectural depiction for one

Thus, in one embodiment, the system 10, shown in FIG. 8, may be a computer, a client, or a server. In this case, it includes a processor 102 coupled to a network interface 104 and a memory 106 that stores software sequences 50 and 90, in one embodiment. The network interface 104 couples to a VOD server 108 which includes the ADM 44 and the VOD video pump 42. The ADM 44 communicates with a number of clients 48. The ADM 44 may include a memory which stores software to implement the VOD server sequence 64 in one embodiment.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   disabling fast forwarding by a media rendering machine during commercials;
   enabling the fast forwarding by the media rendering machine during play of non-commercial content;
   wherein the disabling and enabling of the fast forwarding are controlled by commands for enabling and disabling trickmode expressly indicated in a playlist; and
   the playlist is compiled by a playlist generator from (a) breakpoints for inserting the commercials during presentation of the non-commercial content, the breakpoints for inserting the commercials comprising time periods specified to the playlist generator separately from the non-commercial content, and (b) an ad map comprising the commands for enabling and disabling trickmode and a number and duration of each of the commercials to display during each of the breakpoints for inserting the commercials.

2. The method of claim 1 including providing commands in the ad map for the each of the breakpoints for inserting the commercials defining whether or not the fast forwarding is permitted during the each of the breakpoints for inserting the commercials.

3. The method of claim 1 including the ad map comprising commands selectively enabling and disabling at least one of the fast forwarding, pause, and rewind during the each of the commercials.

4. The method of claim 1 including the playlist configured to always enable the fast forwarding during the play of the non-commercial content.

5. The method of claim 1 including the commercials to play during the breakpoints for inserting the commercials not defined in the playlist.

6. The method of claim 5 including the playlist configured to disable the fast forwarding during the breakpoints for inserting the commercials.

7. A video on demand server comprising:
   a video pump;
   an ad management system interface to disable fast forwarding during commercials and enable the fast forwarding during play of non-commercial content utilizing commands for enabling and disabling trickmode expressly indicated in a playlist; and
   a playlist generator to configure the disabling and enabling of the fast forwarding and to compile the playlist from (a) breakpoints for inserting the commercials during presentation of the non-commercial content, the breakpoints for inserting the commercials comprising time periods specified to the playlist generator separately from the non-commercial content, and (b) an ad map comprising the commands for enabling and disabling trickmode and a number and duration of each of the commercials to display during each of the breakpoints for inserting the commercials.

8. The video on demand server of claim 7, the ad map comprising commands for the each of the breakpoints for inserting the commercials defining whether or not the fast forwarding is permitted during the each of the breakpoints for inserting the commercials.

9. The video on demand server of claim 7, the ad map comprising commands selectively enabling and disabling at least one of the fast forwarding, pause, and rewind during the each of the commercials.

10. The video on demand server of claim 7, the playlist configured to always enable the fast forwarding during the play of the non-commercial content.

11. The video on demand server of claim 7, the commercials to play during the breakpoints for inserting the commercials not defined in the playlist.

12. The video on demand server of claim 7, the playlist configured to disable the fast forwarding during the breakpoints for inserting the commercials.

\* \* \* \* \*